United States Patent
Lefebvre

(10) Patent No.: US 8,346,195 B2
(45) Date of Patent: Jan. 1, 2013

(54) FULL SPECTRUM TIME SHIFTING DEVICE

(75) Inventor: Fabien Lefebvre, Evrecy (FR)

(73) Assignee: NXP B.V., Eindhoven (NL)

( * ) Notice: Subject to any disclaimer, the term of this patent is extended or adjusted under 35 U.S.C. 154(b) by 143 days.

(21) Appl. No.: 12/974,305

(22) Filed: Dec. 21, 2010

(65) Prior Publication Data

US 2011/0151822 A1    Jun. 23, 2011

(30) Foreign Application Priority Data

Dec. 21, 2009   (EP) .................................... 09290979

(51) Int. Cl.
*H04B 1/18* (2006.01)
*H04K 3/00* (2006.01)

(52) U.S. Cl. .................. 455/185.1; 455/412.1
(58) Field of Classification Search ............... 455/412.1, 455/412.2, 550.1, 184.1–186.1
See application file for complete search history.

(56) References Cited

U.S. PATENT DOCUMENTS

| | | | | |
|---|---|---|---|---|
| 5,157,728 A | * | 10/1992 | Schorman et al. | ............ 704/502 |
| 5,371,551 A | | 12/1994 | Logan et al. | |
| 6,490,000 B1 | | 12/2002 | Schaefer et al. | |
| 2009/0070597 A1 | * | 3/2009 | Shah et al. | .................... 713/189 |

FOREIGN PATENT DOCUMENTS

| | | |
|---|---|---|
| EP | 1185095 A1 | 3/2002 |
| WO | 02/067447 A2 | 8/2002 |

OTHER PUBLICATIONS

Hentschel, "The Digital Front-End of Software Radio Terminals", IEEE Personal Communications, vol. 6, No. 4, pp. 40-46 (Aug. 1999).
Rudra, A. "Multichannel, Multiband VHF Software Radio Based Receiver Eliminates RF Down Conversion", retrieved from the Internet on Oct. 12, 2012 at http://mobiledevdesign.com/images/archive/307RF_Rudra38.pdf (Jul. 2003).
Extended European Search Report for European Patent Appln. No. 09290979.5 (Sep. 29, 2010).

* cited by examiner

*Primary Examiner* — Lee Nguyen

(57) ABSTRACT

A time shifting device receives a full broadcast band, such as the FM radio band, demodulates the received full broadcast band into each component broadcast channel, and stores the program signal received from each broadcast channel in a buffer, thereby enabling continuous time-shifting of the content without requiring any prior program pre-selection. The disclosed time shifting device includes an analog to digital converter which digitizes an analog broadband radiofrequency signal, which may include some or all allocated broadcast channels of the targeted broadcast band, into a digital broadband radiofrequency signal. A digital filter and demodulation circuit demodulates the digitized broadband signal into individual datastreams corresponding to the various broadcast channels contained in the broadcast band. The datastreams are stored in a circular buffer for selective playback by a user. Program metadata may be utilized to identify and select programs for playback.

18 Claims, 1 Drawing Sheet

FULL SPECTRUM TIME SHIFTING DEVICE

This application claims the priority under 35 U.S.C. §119 of European patent application no. 09290979.5, filed on Dec. 21, 2009, the contents of which are incorporated by reference herein.

BACKGROUND OF THE INVENTION

The present disclosure relates to systems, apparatus, and methods for time shifting broadcast signals, and more particularly, for the storing and selective playback of a plurality of simultaneously-broadcasted radio signals in a broadcast band.

Time-shifting has become a popular feature in consumer electronic devices. Generally, time-shifting allows a user to record a program broadcast at an earlier time, and replay the program at a later, more convenient time. Whereas in the past, users needed to manually program a tape recording device to record broadcasted programs to magnetic tape (e.g., an audio cassette tape or VHS video tape), improvements in technology have raised consumer expectations in that automatic recording and time-shifting devices (e.g., digital video recorders a.k.a. DVRs) which record automatically to high-capacity digital media are now the norm, the random-access properties of digital media facilitating playback operations such as time-shifting and commercial skipping. The advantages of time shifting are well-recognized, and enable users to enjoy broadcasts according to their own schedule and lifestyle, rather than forcing the consumer to conform one's viewing habits to a broadcaster's schedule.

Often, two or more programs may be broadcast at the same time on different channels, forcing the consumer to choose one program over the other. Time shifting enables a consumer to watch one program while recording another, or, if their hardware is capable, to simultaneously record both programs for later viewing.

Other forms of media delivery devices, such as personal mp3 players and interne streaming media, have also raised expectations for consumers, who now demand access to whatever media they wish, at any time.

In contrast, a conventional automotive radio receiver typically receives a single analog program that is broadcast over the AM or FM band.

Conventional time-shifting devices may have drawbacks, because a user must specify, in advance, which programs to record. Additionally, conventional time-shifting devices, which have tuner sections that decode the signals for the program(s) of interest prior to recording, are unable to record more than two or three concurrent programs out of dozens or even hundreds of programs which may be broadcast at a given time, which substantially narrows a consumer's ability to view desired content in a convenient manner.

SUMMARY OF THE INVENTION

It is therefore an object of the present disclosure to provide an improved media time-shifting device. A time shifting device in accordance with the present disclosure receives a full broadcast band, such as the complete FM radio band, demodulates the received full broadcast band into each component broadcast channel, and stores the program signal received from each broadcast channel in a buffer, thereby enabling continuous time-shifting of the entire content of the broadcast band without requiring any prior program pre-selection. Alternatively, the entire unmodulated band signal can be buffered and then after buffering the band signal can be demodulated and channels of interest output or stored.

In one aspect, the disclosed time-shifting device may be embodied in a broadcast receiver, e.g., a car radio, to enable a user to listen to media which was broadcast and recorded while the user was out of the vehicle. In an embodiment, a car radio in accordance with the present invention may include the ability to "wake up" automatically, and begin buffering content without further intervention by a user. In embodiments, the disclosed time shifting device may be embodied in an audio broadcast receiver (radio) and/or a video broadcast receiver (television). It is envisioned the disclosed time shifting device may operate with terrestrial broadcast signals, satellite broadcast signals, cable broadcast signals, and/or combinations thereof, as well as any suitable broadcast technology developed hereafter.

In an embodiment, the disclosed device may enable a user to download (e.g., transfer) all or part of a recorded program to removable media, which may be a convenient way to complete one's library of music, for example. In yet another embodiment, recorded content may be transferred to another device via a wired connection (e.g., USB) or a wireless connection (e.g., cellular network, 802.11 WiFi, Bluetooth, and the like).

In yet another embodiment in accordance with the present disclosure, the disclosed device receives metadata program information transmitted in association with a program broadcast, such as program identification data available via radio data service (RDS), which, in turn, is used to identify program segments, e.g., individual songs, that are recorded in the buffer. Additionally or alternatively, content analysis techniques may be utilized to identify recorded content. Advantageously, the recorded content identification data may be utilized by a consumer to search for, and select, songs which have been previously recorded. In still another embodiment, the disclosed device may provide the ability to define one or more virtual channels having one or more defined characteristics (e.g., musical genre, artist, talk radio format, and the like), and automatically select and play back content which matches the characteristics of the predefined virtual channel. In this manner, custom programming may be enjoyed by a consumer based on content originally broadcast on any number of available broadcast channels. In yet another embodiment, the disclosed device may provide automated playlist generation based, at least in part, upon recorded content and user preferences.

In an embodiment, the disclosed device includes one or more wide band analog-to-digital converters. The band may be split into as many channels as exists in the band. Demodulation may then take place, which may in turn reduce buffer memory usage, and the digitized program data may then be stored in the buffer. During playback, a user may freely parse the content of the buffer, e.g., rewind, fast forward, and pause program material as desired. Access to data may be substantially instantaneous since the buffer may include quick access storage devices such as, without limitation, flash memory and/or a hard disk drive. Similarly, transfer of material to removable or remote media can be considered to be nearly instantaneous as well.

In accordance with an exemplary embodiment of the present disclosure as set forth herein, a time shifting device includes an analog to digital converter that is adapted to receive an analog broadband radiofrequency signal, and to provide a corresponding digital broadband radiofrequency signal, wherein the analog broadband radiofrequency signal has a program signal encoded therein. The disclosed device includes a digital filter and demodulation circuit that is operably coupled to the analog to digital converter, and is adapted to provide a digital program signal corresponding to the broadcast program signal. The digital program signal is stored in a circular buffer that is operably coupled to the digital filter and demodulation circuit. The circular buffer is adapted to store program data corresponding to the digital program signal. The device also includes a controller operably coupled to the circular buffer and is adapted to selectively receive stored program data from the circular buffer and to provide an output signal corresponding to the stored program data.

The disclosed time shifting device may include a packetizer that is operably coupled to the digital filter and demodulation circuit that is adapted to encode the at least one digital program signal into a storage format for storage in a circular buffer. The storage format may include lossy or lossless data compression. The disclosed device may be configured to decode metadata associated with a program signal. In an embodiment, the program data may be selectively stored in the circular buffer based at least in part upon the metadata. Additionally or alternatively, the metadata may be stored in the circular buffer in association with the corresponding stored program data.

A time shifting device in accordance with another exemplary embodiment of the present disclosure includes an analog to digital converter adapted to receive a plurality of analog carrier frequency broadcast signals, and to provide a digital signal corresponding thereto, wherein at least one analog carrier frequency broadcast signal includes a program signal. The disclosed time shifting device includes a digital bandpass filter circuit that is operably coupled to the analog to digital converter and adapted to pass at least a portion of the digital signal which corresponds to a targeted broadcast band, such as without limitation, at least a portion of the FM broadcast band. A frequency downconverter is operably coupled to the digital filter and is adapted to convert the passed portion of the digital signal into an intermediate frequency digital signal for storage in a circular buffer. The circular buffer is operably coupled to the frequency downconverter, and is adapted to store the intermediate frequency digital signal. A demodulator is operably coupled to the circular buffer, and is adapted to receive, and selectively demodulate, the stored intermediate frequency digital signal to provide a program signal to a controller. The controller is operably coupled to the demodulator and is adapted to provide an output signal corresponding to the program signal.

According to yet another exemplary embodiment of the present disclosure as set forth herein, a method for time shifting a broadcast band is disclosed. The method comprises receiving an analog broadband radiofrequency signal, which has a plurality of carrier frequency broadcast signals included therein, and converting the analog broadband radiofrequency signal into a corresponding digital broadband radiofrequency signal. The digital broadband radiofrequency signal is demodulated into a plurality of digital program signals, which correspond to the carrier frequency broadcast signals. The plurality of digital program signals are stored in a circular buffer. The stored digital program signal is read from the circular buffer, and output for playback by a user.

Still another exemplary embodiment of a method for time shifting a broadcast band in accordance with the present disclosure is presented. The method comprises receiving an analog broadband radiofrequency signal having a plurality of carrier frequency broadcast signals included therein. The analog broadband radiofrequency signal is converted into a digital broadband radiofrequency signal which is downconverted to obtain a downconverted digital broadband signal. The downconverted digital broadband signal is stored in a circular buffer, the downconverted digital broadband signal is demodulated into at least one digital program signal, and the digital program signal is output for playback by a user.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF EMBODIMENTS

Particular embodiments of the present disclosure are described herein below with reference to the accompanying drawings; however, it is to be understood that the disclosed embodiments are merely exemplary of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Figure 1:
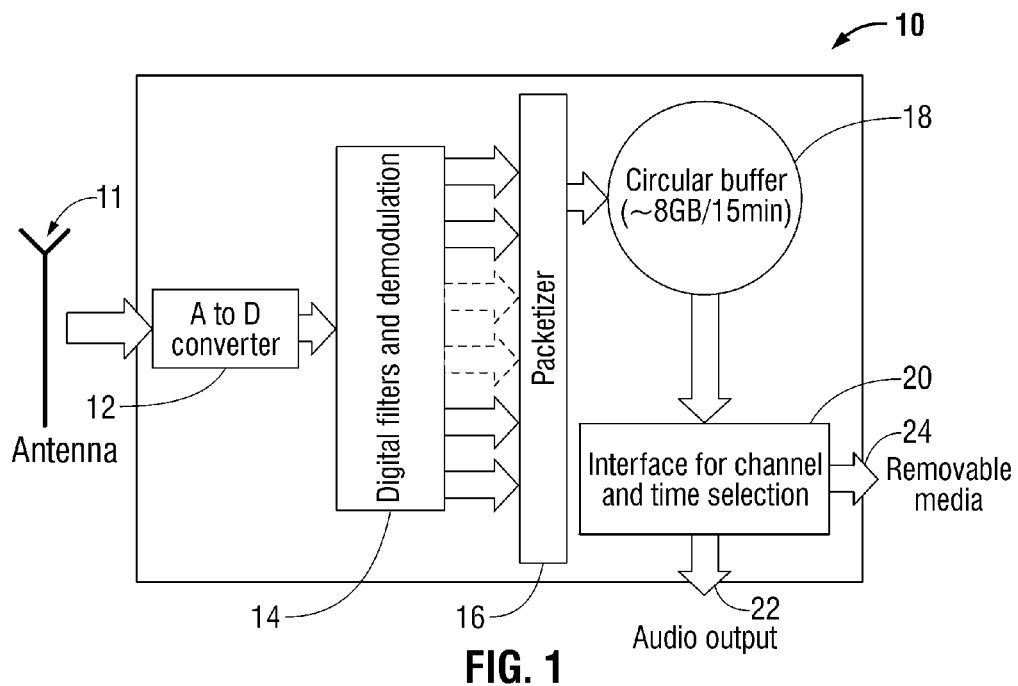
FIG. 1 shows a simplified block diagram of a first embodiment of a time shifting device in accordance with the present disclosure.

FIG. 1 shows a block diagram of a first envisioned embodiment of a time shifting device 10 in accordance with the present disclosure. The time shifting device 10 includes a high-speed analog-to-digital (A/D) converter 12 that is adapted to receive an analog broadband radiofrequency (RF) signal from an antenna assembly 11, and to convert the analog broadband RF signal into a digital broadband signal. The analog broadband signal may include at least one (and, more likely, plural) carrier frequency broadcast signal(s), which may be modulated by any manner of modulation, now or in the future known, for the transmission of analog or digital content. By way of example only, an analog broadband RF signal may include an amplitude modulated signal (AM band), a frequency modulated signal (FM band), a digital audio broadcasting (DAB) signal, an in-band on-channel (IBOC) digital radio signal, an ATSC modulated signal (over-the air digital television content), a QAM signal (cable television digital content), and the like.

It should be understood that while the content of a carrier frequency broadcast signal, sometimes referred to as the baseband signal, may be analog and/or digital, the broadcast transmission thereof is regarded to be in the analog realm. Analog baseband signals (e.g., AM, FM) and digital baseband signals (e.g., DAB, ATSC, etc.) are transmitted using analog broadcast signals. Broadband broadcast signals are regarded herein to be analog signals, and are to be distinguished from baseband program signals which may be analog, digital, or a combination thereof.

Antenna assembly 11 may include bandpass, tuning, and gain elements (not explicitly shown) to provide A/D converter 12 with a signal having a dynamic range (e.g., peak amplitude) which generally conforms to the dynamic range of A/D converter 12. In this manner, the full resolution of A/D converter may be utilized, which may result in higher sensitivity, better selectivity, and reduced crosstalk between channels.

Additionally or alternatively, antenna assembly 11 may provide a signal to A/D converter 11 which includes that portion of the RF spectrum corresponding to the targeted broadcast band, e.g., 87.9 to 107.9 MHz for an FM broadcast band, 530 kHz to 1700 kHz for an AM broadcast band, and so forth. It is envisioned that a time shifting device in accordance with the present disclosure may be used with any RF broadcast band, and is not limited to media and entertainment applications. For example, and without limitation, the disclosed time shifting device may be used with navigational communications channels (e.g., aeronautical, maritime, and space communications), personal radio communications (CB channels, FRS channels, GMRS channels, amateur ham radio channels), and the like.

A digital filter and demodulation circuit (DFD) 14 receives the digitized RF signal from A/D converter 12. DFD 14 includes at least one digital filter and one digital demodulator that are adapted to provide a digital program signal (e.g., the raw channel datastream) from the digitally-encoded RF signal received from A/D converter 12. A digital filter included within DFD 14 may include any suitable digital filter arrangement, including without limitation, recursive digital filters (which may be referred to as infinite impulse response or IIR filters), non-recursive digital filters (a.k.a. finite impulse response or FIR filters), a cascaded integrator-comb (CIC) digital filters, and/or combinations thereof. DFD 14 includes one or more digital signal processors configured to execute a set of programmable instructions for implementing one or more digital filters, any of which may be a bandpass filter, and one or more digital demodulator, such as without limitation an FM demodulator, an AM demodulator, and/or an SSB (single sideband) carrier demodulator. In an embodiment, DFD 14 may include one or more digital filter/digital demodulator pairs (not shown). Each digital filter/digital demodulator pair may, in turn, correspond to one of the plurality broadcast channel of the targeted broadcast band. DFD 14 may include algorithms for demodulating FM signals and/or AM signals. Advantageously, the use of digital filtering and digital demodulation as disclosed herein enables the concurrent reception of all, or a substantial number of, broadcast channels within a targeted broadcast band at a relatively low cost.

DFD 14 may additionally be configured to decode and/or receive RDS data associated with a broadcast channel program signal, if such data is available (additional components to do so may be provided). RDS data may provide such program information as broadcaster identification (e.g., "call letters"), program type or genre, artist, song title, album name, and so forth. Received RDS data may be incorporated as metadata within the datastream output of each digital filter/digital demodulator pair, and/or stored in a database which references the associated program data stored in circular buffer 18.

A targeted broadcast band includes a plurality of individual channels. As an example only, an FM band may include 102 individual channels, or "stations". In order to provide sufficient audio quality to meet consumer expectations, an individual channel datastream may be encoded in 12-bit resolution at a sampling frequency of 32 kb/s (kilobits per second). Assuming stereo (2-channel) audio for each channel, the total output bandwidth of DFD 14 may be computed as 102 broadcast channels×2 program channels×12 bits/channel×32 kb/s, or about 76 Mb/s (megabits per second).

Within each geographic region, the number of active broadcast channels is fewer than the total number of broadcast channels allocated for use. Packetizer 16 and/or DFD 14 may include the capability to differentiate between active and inactive broadcast channels and enable the storage of only those broadcast channels which are actively transmitting. In this manner, the efficiency and capacity of the disclosed time-shifting device 10 may be enhanced by reducing the amount of buffer storage consumed by inactive channels, which, in turn, increases the amount of storage available for active broadcasts and reduces processing requirements and system overhead.

The datastream output of each digital filter/digital demodulator pair is received by a packetizer 16, wherein the raw datastream is encoded for storage in a circular buffer 18. Circular buffer 18 may be logically divided into a plurality of sub-buffers, each corresponding to, e.g., an individual broadcast channel or an individual program or song. Circular buffer 18 may include any suitable form of high-speed, random access digital storage medium, including without limitation, dynamic RAM, flash RAM, and/or hard disk drive. At a combined bitrate of approximately 76 Mb/s, a circular buffer of about 8 GB (gigabyte) in size is sufficient to store about fifteen minutes of time-shifted programming. An 80 GB buffer will provide about two-and-a-half hours of programming, while a 1 TB buffer may provide over a day's worth of programming. In similar fashion, if the data to be stored is compressed less heavily, which can reduce the amount of processing power required, then a larger buffer can be provided to store an equivalent amount of data.

Packetizer 16 may encode program datatreams in any suitable digital format, including without limitation, linear encoding, μ-law, and/or A-law. Additionally or alternatively, packetizer 16 may perform lossless or lossy data compression upon one or more program datastreams, such as without limitation, MPEG-1 Audio Layer 3 (MP3) compression in either constant or variable bitrate formats, Advanced Audio Coding (AAC) compression, Free Lossless Audio Codec (FLAC) compression, or Ogg Vorbis compression. Advantageously, by compressing the one or more program datastreams, the amount of time-shifted programming stored in circular buffer 18 with the present disclosure may be significantly increased. During use, circular buffer 18 continually receives packetized (encoded) program datastreams for storage therein.

The disclosed time shifting device includes a controller 20 that is configured to operably communicate with a user interface of a host device, e.g., the front panel of a car radio, to selectively read a desired program datastream from circular buffer 18, and to provide the selected program data for playback and/or for delivery to an external device. Controller 20 includes at least one audio output port 22, which may be a digital output port compliant with the S/PDIF (Sony/Philips Digital Interconnect Format), AES/EBU (promulgated by the Audio Engineering Society "AES" and the European Broadcasting Union "EBU") format, or any suitable digital audio format. Additional or alternative audio output formats may be provided, including without limitation, an analog audio output. In embodiments wherein an analog audio output is provided, controller 20 may include a digital-to-analog (D/A) converter configured to operably receive a decoded datastream from circular buffer 18 for delivery to an audio output 22.

Controller 20 provides a host control interface (not explicitly shown) to a host device to facilitate the identification, organization, reading, playback, and/or manipulation of content stored within circular buffer 18 by the host device and/or a user thereof. The host control interface may be any suitable data communication interface, including without limitation a parallel interface, a serial interface, a USB interface, a SATA interface, and the like. The host control interface may be capable of providing bi-directional communications between the time shifting device 10 and a host device, using, for example, a command-response protocol.

Controller 20 may additionally provide a storage interface 24. Storage interface 24 may be configured to operably communicate with any suitable external storage device, including without limitation a USB memory stick or other flash RAM-based devices, e.g., CompactFlash®, SD® cards, external USB hard drives, external hard drives, and the like. Storage interface 24 may additionally or alternatively be configured to operably communicate with a remote storage device via a data network, e.g., a LAN or the Internet, to enable the downloading of content thereto. Storage interface 24 may include an Ethernet interface, an 802.11 a/b/g/n wireless networking interface (a.k.a. WiFi), or any other suitable interface for data communications.

Controller 20 may include the capability to select recorded material, or "tracks", based upon metadata associated therewith to create one or more "custom" or "virtual" channels. For example, a user, through a user interface, may specify that only a certain genre of music be played back. In response, controller 20 may query the metadata to identify tracks matching a desired genre, and optionally or alternatively, create a playlist therefrom. In this manner, a user may enjoy any track of a selected genre that was broadcast on any channel within a time period determined by the storage capacity of circular buffer 18. Assuming a circular buffer 18 having a capacity of 1 TB, for instance, a user could specify a search for "country music", which would in turn cause every country song that was broadcast within approximately the past 31 hours to be queued for playback. Some or all of the buffered tracks satisfying the query may be added to the playlist. The playlist may be dynamically updated in accordance with newly-buffered material, thus the controller 20 in one aspect may continually append and/or modify the playlist. In embodiments, controller 20 may perform program deduplication whereby a particular program, e.g., a musical performance, will not be recorded if the same program is known to have been previously recorded and/or currently exists within circular buffer 18.

Figure 2:
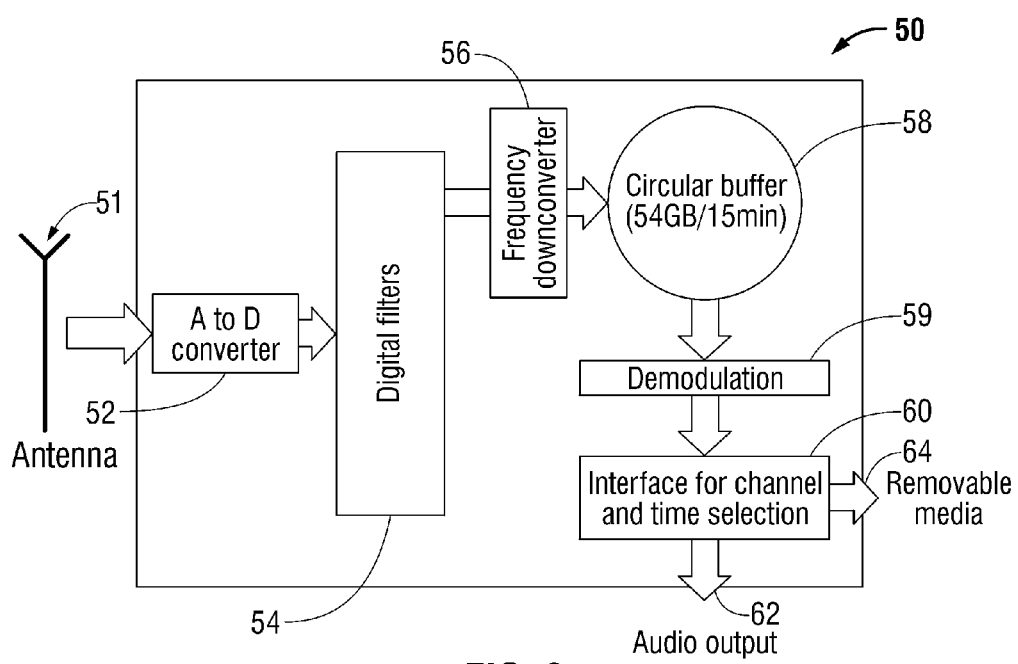
FIG. 2 shows a simplified block diagram of a second embodiment of a time shifting device in accordance with the present disclosure.

Turning to FIG. 2, a block diagram of a second envisioned embodiment of a time shifting device 10 in accordance with the present disclosure is shown. The time shifting device 50 includes a high-speed analog-to-digital (A/D) converter 52 that is adapted to receive a broadband radiofrequency (RF) signal from an antenna assembly 51. The broadband RF signal may include one or more analog carrier frequency broadcast signals, e.g., broadcast channels. Antenna assembly 51 may include bandpass, tuning, and gain elements (not explicitly shown) as previously described herein. Additionally or alternatively, antenna assembly 51 may provide an input signal to the A/D converter 11 which includes that portion of the RF spectrum corresponding to the targeted broadcast band, e.g., 87.9 to 107.9 MHz for an FM broadcast band, 520 kHz-1,610 kHz for an AM broadcast band, and so forth.

A digital filter circuit 54 includes one or more digital filter(s) that receive the output of (A/D) converter 52. Digital filter circuit 54 is configured in a bandpass arrangement to include a portion of the RF spectrum which corresponds to the desired broadcast band, to provide a digitized full spectrum signal to an input of frequency downconverter 56. In a variant, a subset of the available channels within a broadcast band as isolated by one or more bandpass filters included within digital filter circuit 54 can be provided to an input of frequency downconverter 56. The channel subset may be user-selectable, such that only a user's favorite channels are stored. Such channels may correspond to the user-programmable station presets commonly found in consumer radio receivers, and/or, may correspond to channels specifically chosen by a user for time-shifting. Frequency downconverter 56 is configured to convert a full spectrum signal from the radiofrequency (RF) broadcast band thereof (e.g., AM band, FM band, etc.) to a lower intermediate frequency (IF) band. Frequency downconverter 56 may include a digital downconverter (DDC) circuit which, in turn, may include a direct digital synthesizer, at least one multiplier, and at least one lowpass filter. In one aspect, frequency downconverter 34 performs downsampling and/or decimation of the full spectrum signal obtained from digital filter circuit 54, which, in turn, reduces the bitrate of the resultant datastream thereby reducing processing resource requirements, and reducing memory used by circular buffer 56 for storing the timeshifted content.

The downconverted, but not yet demodulated, full spectrum signal is stored in circular buffer 58 in a substantially continuous manner. In an embodiment, the downconverted fullband datastream may be output from frequency downconverter 56 to circular buffer 58 at a rate of about 492 Mb/s. During playback, the datastream is output from circular buffer 58 to an input of demodulator 59. In turn, demodulator 59 demodulates the intermediate frequency (IF) datastream signal received from circular buffer into one or more digital audio datastream(s) which correspond to an originally broadcast program. Controller 60 receives the one or more audio datastreams for output at an output port 62, as previously described hereinabove.

Optionally, a time shifting device could be provided in accordance with aspects of both of the foregoing embodiments, so that a user could select whether to time shift only certain programs signals, or the entire broadcast band. Choosing the former could provide a longer buffer window than the latter, since full-band buffering might use more of the circular buffer, depending, of course, upon the extent to which the full band signal is compressed.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law. It is to be understood that the steps of a method provided herein may be performed in combination and/or in a different order than presented herein without departing from the scope and spirit of the present disclosure. The claims can encompass embodiments in hardware, software, firmware, microcode, semiconductor die, or a combination thereof.

The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the invention described herein are capable of operation in other sequences and/or arrangements than are described or illustrated herein.

The invention claimed is:

1. A time shifting device, comprising:
   an analog to digital converter adapted to receive an analog broadband radiofrequency signal and to provide a corresponding digital broadband radiofrequency signal, wherein the analog broadband radiofrequency signal has encoded therein at a plurality of program signals;
   a digital filter and demodulation circuit operably coupled to the analog to digital converter and adapted to provide at least one digital program signal corresponding to the plurality of program signals;
   a circular buffer operably coupled to the digital filter and demodulation circuit and adapted to store program data corresponding to the at least one digital program signal; and
   a controller operably coupled to the circular buffer and adapted to selectively receive stored program data from the circular buffer and to provide an output signal corresponding to the stored program data.

2. A time shifting device in accordance with claim 1, further comprising a packetizer operably coupled to the digital filter and demodulation circuit and adapted to encode the at least one digital program signal into a storage format for storage in a circular buffer.

3. A time shifting device in accordance with claim 1, wherein the digital filter and demodulation circuit is configured to decode metadata associated with a program signal, and the metadata is stored in the circular buffer in association with the corresponding stored program data.

4. A time shifting device in accordance with claim 3, wherein the selective reception by the controller of stored program data from the circular buffer is based at least in part upon the associated stored metadata.

5. A time shifting device in accordance with claim 3, wherein the controller is adapted to provide an output signal corresponding to the metadata corresponding to the program signal.

6. A time shifting device in accordance with claim 1, further comprising a storage interface configured to operably communicate with an external storage device.

7. A time shifting device, comprising:
   an analog to digital converter adapted to receive a plurality of analog carrier frequency broadcast signals and to provide a digital signal corresponding thereto, wherein at least one analog carrier frequency broadcast signal includes a program signal;
   a digital bandpass filter circuit operably coupled to the analog to digital converter and adapted to pass at least a portion of the digital signal corresponding to a targeted broadcast band;
   a frequency downconverter operably coupled to the digital filter and adapted to convert the passed portion of the digital signal into an intermediate frequency digital signal;
   a circular buffer operably coupled to the downconverter and adapted to store the intermediate frequency digital signal;
   a demodulator operably coupled to the circular buffer and adapted to receive and selectively demodulate the stored intermediate frequency digital signal to provide a program signal; and
   a controller operably coupled to the demodulator and adapted to provide an output signal corresponding to the program signal.

8. A time shifting device in accordance with claim 7, wherein the demodulator is adapted to receive and selectively demodulate the stored intermediate frequency digital signal to provide metadata corresponding to the program signal.

9. A time shifting device in accordance with claim 8, wherein the controller is adapted to provide an output signal corresponding to the metadata corresponding to the program signal.

10. A time shifting device in accordance with claim 7, further comprising a storage interface configured to operably communicate with an external storage device.

11. A time shifting device in accordance with claim 7, wherein the controller is includes a host control interface adapted to receive a user input.

12. A time shifting device in accordance with claim 11, wherein the demodulator is adapted to selectively demodulate the stored intermediate frequency digital signal in accordance with a user input.

13. In a broadcast receiver, a method for time shifting a broadcast band, comprising:
   receiving an analog broadband radiofrequency signal having a plurality of carrier frequency broadcast signals included therein;
   converting the analog broadband radiofrequency signal into a digital broadband radiofrequency signal;
   demodulating the digital broadband radiofrequency signal into a plurality of digital program signals;
   storing at least one of the plurality of digital program signals in a circular buffer;
   reading a stored digital program signal from the circular buffer; and
   outputting the digital program signal.

14. A method for time shifting a broadcast band in accordance with claim 13, further comprising encoding at least one of the plurality of digital program signals for storage in the circular buffer.

15. A method for time shifting a broadcast band in accordance with claim 13, wherein the demodulating step includes decoding metadata associated with a program signal.

16. In a broadcast receiver, a method for time shifting a broadcast band, comprising:
   receiving an analog broadband radiofrequency signal having a plurality of carrier frequency broadcast signals included therein;
   converting the analog broadband radiofrequency signal into a digital broadband radiofrequency signal;
   downconverting the digital broadband radiofrequency signal to obtain a downconverted digital broadband signal;
   storing the downconverted digital broadband signal in a circular buffer; and
   demodulating the downconverted digital broadband signal into at least one digital program signal; and outputting the digital program signal.

17. A method for time shifting a broadcast band in accordance with claim 16, further comprising encoding the downconverted digital broadband signal for storage in the circular buffer.

18. A method for time shifting a broadcast band in accordance with claim 16, wherein the demodulating step includes decoding metadata associated with a program signal.

* * * * *